United States Patent
Geo et al.

(10) Patent No.: US 10,491,747 B2
(45) Date of Patent: Nov. 26, 2019

(54) MOBILE COMMUNICATIONS DEVICE AND A METHOD FOR CONTROLLING A MOBILE COMMUNICATIONS DEVICE

(71) Applicant: Intel IP Corporation, Santa Clara, CA (US)

(72) Inventors: Wins Geo, Unterhaching (DE); Kranthi Paidipally, Munich (DE); Ravikumar Basavanatha Shivanarayana, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/355,092

(22) Filed: Nov. 18, 2016

(65) Prior Publication Data
US 2017/0180550 A1 Jun. 22, 2017

(30) Foreign Application Priority Data

Dec. 21, 2015 (DE) .......................... 10 2015 122 338

(51) Int. Cl.
| | |
|---|---|
| *H04M 3/428* | (2006.01) |
| *H04W 4/12* | (2009.01) |
| *H04W 4/16* | (2009.01) |
| *H04M 7/00* | (2006.01) |
| *H04W 88/06* | (2009.01) |

(52) U.S. Cl.
CPC ....... *H04M 3/4288* (2013.01); *H04M 7/0042* (2013.01); *H04W 4/12* (2013.01); *H04W 4/16* (2013.01); *H04M 2203/651* (2013.01); *H04W 88/06* (2013.01)

(58) Field of Classification Search
CPC ......... H04M 2203/651; H04M 3/4288; H04M 7/0042; H04W 4/12; H04W 4/16; H04W 88/06
See application file for complete search history.

(56) References Cited

U.S. PATENT DOCUMENTS

| | | | | |
|---|---|---|---|---|
| 2002/0136384 | A1* | 9/2002 | McCormack | H04M 3/4285 379/215.01 |
| 2007/0213100 | A1* | 9/2007 | Osann, Jr. | H04M 1/6505 455/567 |
| 2009/0312031 | A1* | 12/2009 | Harris | H04L 41/147 455/453 |
| 2010/0190526 | A1 | 7/2010 | Marks | |

(Continued)

OTHER PUBLICATIONS

German Office Action based on Application No. 10 2015 122 338.4 (7 Pages) dated Aug. 1, 2016 (Reference Purpose Only).

*Primary Examiner* — Wayne H Cai
(74) *Attorney, Agent, or Firm* — Viering, Jentschura & Partner MBB (57) ABSTRACT

A method for controlling a mobile communications device and a mobile communications device including a radio processing circuit and a baseband processing circuit adapted to interact with the radio processing circuit, configured to: receive a first call on a first subscriber identity module of a mobile communications device; receive a second call on a second subscriber identity module of the mobile communications device; suspend the first call on a local hold; switch to the second call from the first call; transmit a message to the first call while the second call is active.

20 Claims, 7 Drawing Sheets

(56) References Cited

U.S. PATENT DOCUMENTS

| | | | | |
|---|---|---|---|---|
| 2011/0177800 A1* | 7/2011 | Gilson | ................... | H04W 4/12 |
| | | | | 455/417 |
| 2013/0003951 A1* | 1/2013 | Pitschel | .............. | H04M 3/4285 |
| | | | | 379/93.13 |
| 2014/0024353 A1* | 1/2014 | Baek | ....................... | H04W 4/16 |
| | | | | 455/417 |
| 2014/0315524 A1* | 10/2014 | Sinha | ................... | H04M 3/428 |
| | | | | 455/414.1 |
| 2017/0094485 A1* | 3/2017 | Saxena | .............. | H04L 41/0813 |

* cited by examiner

MOBILE COMMUNICATIONS DEVICE AND A METHOD FOR CONTROLLING A MOBILE COMMUNICATIONS DEVICE

RELATED APPLICATIONS

This application claims priority of German patent application No. 10 2015 122 338.4, filed on Dec. 21, 2015, the entire contents of which are hereby incorporated herein by reference.

TECHNICAL FIELD

Various aspects of this disclosure relate generally to a mobile communications device and a method for controlling the mobile communications device.

BACKGROUND

Multi-SIM (subscriber identity module) mobile communication devices provide users the convenient option of having access to multiple accounts and communication networks in a single device. Access to multiple communication networks may, however, introduce complexities and new issues as supplementary services (e.g., call waiting, call hold) may not be available between separate networks.

For example, during a first ongoing voice call (i.e., the first call may be active) for a network associated with a first SIM, a user may receive an incoming call on a network associated with a second SIM, e.g., a network connection in idle mode for the second SIM may receive a page for a mobile terminated (MT) call (the call may be circuit switched or packet switched). The user may accept the incoming call associated with the second SIM, however, the party (or parties) on the first voice call may not receive any indication that the user has switched to the second voice call.

When the user switches to the second voice call, the first voice call connection is maintained on a local hold, i.e., the mobile communications device maintains the active connection by transmitting silence descriptor (SID) frames to the party on the first voice call, thus placing the party on semi-hold or local hold. The party on the first voice call may only receive comfort noise due to, e.g., discontinuous reception (DRX) and a lack of transmitted audio signals detected by voice activity detection (VAD), and may not receive any indication that the call has been placed on a local hold.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as, for example, Java. Any other kind of implementation of the respective functions which will be described in more detail below may also be understood as a "circuit". It is understood that any two (or more) of the described circuits may be combined into a single circuit with substantially equivalent functionality, and, conversely, that any single described circuit may be distributed into two (or more) separate circuits with substantially equivalent functionality. In particular with respect to the use of "circuitry" in the Claims included herein, the use of "circuit" may be understood as collectively referring to two or more circuits.

A "processing circuit" (or equivalently, "processing circuitry") as used herein, is understood as referring to any circuit that performs an operation(s) on signal(s), such as, e.g., any circuit that performs processing on an electrical signal or an optical signal. A processing circuit may thus refer to any analog or digital circuitry that alters a characteristic or property of an electrical or optical signal, which may include analog data, digital data, or a combination thereof. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g., a processor or microprocessor). As utilized herein, "digital processing circuit(ry)" may refer to a circuit implemented using digital logic that performs processing on a signal, e.g., an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s)

(FPGA), integrated circuit(s), Application Specific Integrated Circuit(s) (ASIC), or any combination thereof. Furthermore, it is understood that a single processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term "memory". It is appreciated that a single component referred to as "memory" or "a memory" may be composed of more than one different type of memory, and thus may refer to a collective component comprising one or more types of memory. It is readily understood that any single memory component may be separate multiple collectively equivalent memory components, and vice versa. Furthermore, it is appreciated that while memory may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile communications device is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is to be noted the ensuing description discusses utilization of a mobile communications device under 3GPP (Third Generation Partnership Project) specifications, notably Long Term Evolution (LTE) and Long Term Evolution-Advanced (LTE-A), as well as 2G specifications. Other mobile radio communications systems, however, may be used, where applicable. Some embodiments may be used in conjunction with one or more types of wireless communication signals and/or systems following one or more wireless communication protocols, for example, Radio Frequency (RF), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced (LTE-a), Enhanced Data rates for GSM Evolution (EDGE), Voice over LTE (VoLTE) or the like. Other embodiments may be used in various other devices, systems, and/or networks. The examples provided herein can apply to other existing, or other not yet formulated standards, so long as they share the underlying features disclosed in the following examples.

Figure 1:
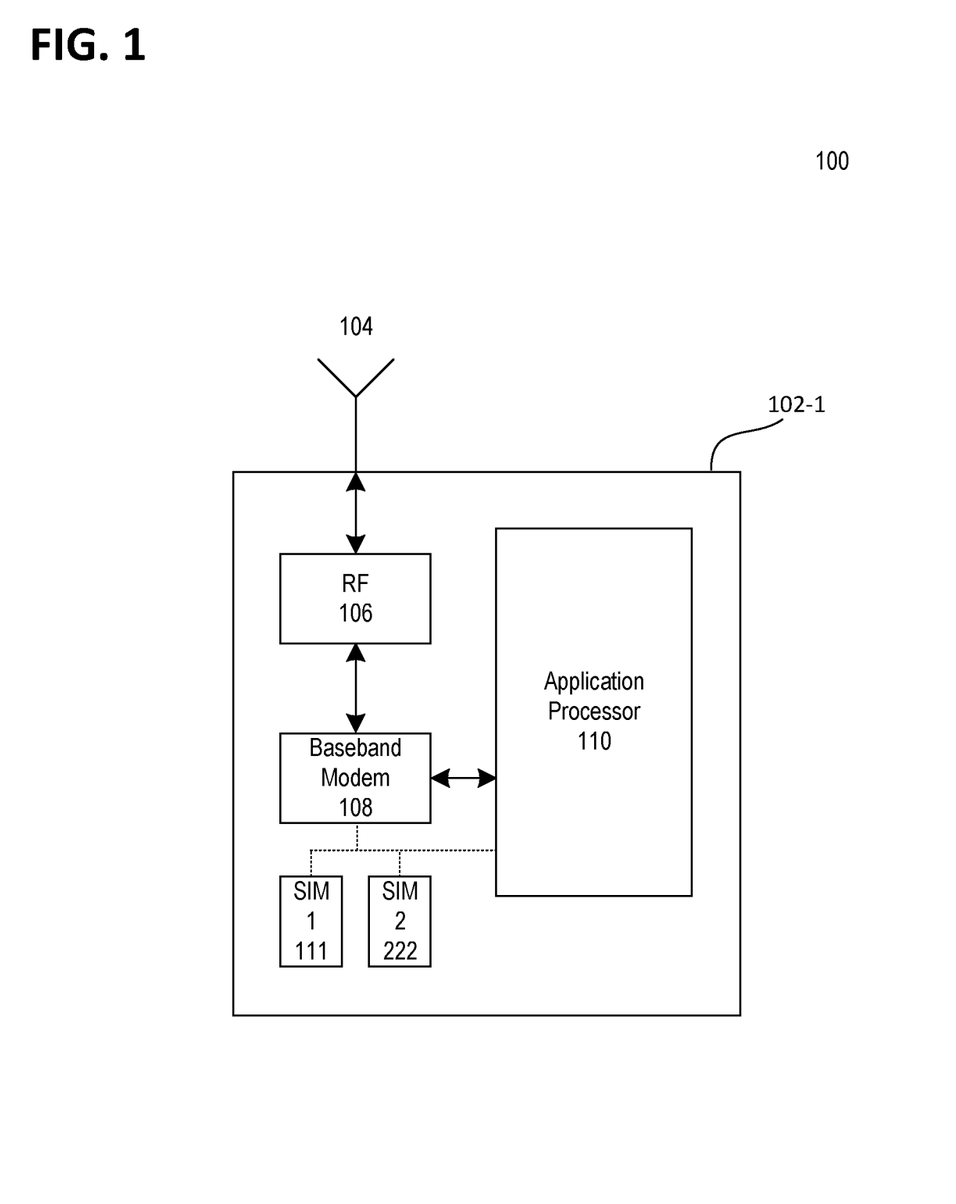
FIG. 1 shows a block diagram illustrating an internal configuration of a mobile communications device.

FIG. 1 shows a block diagram 100 illustrating an internal configuration of mobile communications device 102-1 according to an aspect of the disclosure. Mobile communications device 102-1 may be configured to: receive a first call on a first SIM 111 of a mobile communications device 102-1, receive a second call one a second SIM 222 of the mobile communications device 102-1, suspend the first call on a local hold, switch to the second call from the first call, and transmit a message to the first call while the second call is active.

As illustrated in FIG. 1, mobile communications device 102-1 may include antenna 104, radio frequency (RF) transceiver 106, baseband modem 108, application processor 110, first SIM 111, and second SIM 222 (mobile communications device 102-1 may be a multi-SIM device). As shown in FIG. 1, the aforementioned components of mobile communications device 102 may be implemented as separate components. However, it is to be appreciated the architecture of mobile communications device 102-1 depicted in FIG. 1 is for explanatory purposes. Therefore, one or more of the aforementioned components of mobile communications device 102-1 may be integrated into a single equivalent component or divided into two separate components with collective equivalence. It is understood mobile communications device 102-1 may have one or more additional components, such as additional hardware, software, or firmware elements. For example, mobile communications device 102-1 may further include various additional components including hardware, firmware, processors, microprocessors, memory, and other specialty or generic hardware, processors, or circuits, etc., in order to support a variety of additional operations. Mobile communications device 102-1 may also include a variety of user input or output devices (display(s), keypad(s), touchscreen(s), speaker(s), external button(s), camera(s), microphone(s), peripheral device(s), memory, power supply, external device interface(s), subscriber identify module(s) (SIM), etc.).

It is appreciated that the aforementioned components of mobile communications device 102-1, in particular, RF transceiver 106, baseband modem 108, and application processor 110, may be implemented in a number of different manners, such as by hardware, firmware, software executed on hardware (e.g., a processor), or any combination thereof. Various options include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s)

(DSP), Field Programmable Gate Array(s) (FPGA), integrated circuit(s), or Application Specific Integrated Circuit(s) (ASIC).

As will be detailed, in an aspect of the disclosure mobile communications device 102-1 may be a mobile communications device having a radio processing circuit (RF transceiver 106) and a baseband processing circuit (baseband modem 108) adapted to interact with the radio processing circuit. Mobile communications device 102-1 may be configured to: receive a first call on a first SIM 111 of a mobile communications device 102-1, receive a second call one a second SIM 222 of the mobile communications device 102-1, suspend the first call on a local hold, switch to the second call from the first call, and transmit a message to the first call while the second call is active.

In an aspect of the disclosure providing an overview of the operation of mobile communications device 102-1; mobile communications device 102-1 may be configured to receive and/or transmit wireless signals according to multiple wireless access protocols or radio access technologies (RATs) that differ, including any one of, or any combination of, LTE (Long Term Evolution), WLAN (wireless local area network), Wi-Fi, UMTS (Universal Mobile Telecommunications System), GSM (Global System for Mobile Communications), Bluetooth, CDMA (Code Division Multiple Access), Wideband CDMA (W-CDMA), etc. The RAT capabilities of mobile communications device 102-1 may be determined by one or more Subscriber Identity Modules (SIM) included in mobile communications device 102-1 (which depicts two SIMs, however, three or more SIMs may also be contemplated). In an aspect of the disclosure, the first SIM 111 and second SIM 222 may be multi-RAT SIMs.

First SIM 111 and second SIM 222 may be located physically in mobile communications device 102-1 or mobile communications device 102-1 may access first SIM 111 and/or second SIM 222, e.g., as eSIMs (embedded SIMs), located in another device, e.g., another mobile communications device (e.g., another user equipment (UE), via cloud computing, or from another device containing the eSIM, such as an automobile). For example, mobile communications device 102-1 may not require that first SIM 111 and second SIM 222 are physically located or physically connected to mobile communications device 102-1 to access the subscriber identity of first SIM 111 or second SIM 222. Mobile communications device 102-1 may access first SIM 111 or second SIM 222 via wireless connection, e.g., Bluetooth or wife.

It is appreciated that separate components may be provided for each distinct type of compatible wireless signals, such as a dedicated LTE antenna, RF transceiver, and baseband modem for LTE reception and transmission, and a dedicated 2G antenna, RF transceiver, and baseband modem for 2G reception and transmission. Alternatively, one or more components of mobile communications device 102-1 may be shared between different wireless access protocols, such as, e.g., by sharing antenna 104 between multiple different wireless access protocols. In an exemplary aspect of the disclosure, RF transceiver 106 and/or baseband modem 108 may be operated according to multiple mobile communication access protocols (i.e., "multi-mode"), and thus may be configured to support one or more of LTE, UMTS, and/or GSM access protocols.

In one aspect of the disclosure, mobile communications device 102-1 may have at least one transmitter and at least one receiver, e.g., a transceiver. Furthermore, RF transceiver 106 may receive radio frequency wireless signals via antenna 104, which may be implemented as, e.g., a single antenna or an antenna array including multiple antennas. RF transceiver 106 may include various reception circuitry elements, which may include, e.g., analog circuitry, configured to process externally received signals; and mixing circuitry, configured to convert externally received RF signals to baseband and/or intermediate frequencies. RF transceiver 106 may also include amplification circuitry to amplify externally received signals, such as power amplifiers (PAs) and/or Low Noise Amplifiers (LNAs), although it is appreciated that such components may also be implemented separately. RF transceiver 106 may additionally include various transmission circuitry elements configured to transmit internally received signals, such as, e.g., baseband and/or intermediate frequency signals provided by baseband modem 108, which may include mixing circuitry to modulate internally received signals onto one or more radio frequency carrier waves and/or amplification circuitry to amplify internally received signals before transmission. RF transceiver 106 may provide such signals to antenna 104 for wireless transmission. Further references herein to reception and/or transmission of wireless signals by mobile communications device 102-1 may thus be understood as an interaction between antenna 104, RF transceiver 106, and baseband modem 108 as detailed above. Although not explicitly depicted in FIG. 1, RF transceiver 106 may be additionally be connected to application processor 110.

Application processor 110 may be implemented as a Central Processing Unit (CPU), and may function as a controller for mobile communications device 102-1. Application processor 110 may be configured to execute various applications and/or programs of mobile communications device 102-1, such as, e.g., applications corresponding to program code stored in a memory component of mobile communications device 102 (not explicitly shown in FIG. 1). Application processor 110 may also be configured to control one or more further components of mobile communications device 102, such as user input/output devices (display(s), keypad(s), touchscreen(s), speaker(s), external button(s), camera(s), microphone(s), etc.), peripheral devices, memory, power supply, external device interfaces, etc.

Although baseband modem 108 and application processor 110 are depicted separately in FIG. 1, it is appreciated that this illustration is not limiting in nature. Accordingly, it is understood that baseband modem 108 and application processor 110 may be implemented separately, implemented together (i.e., as an integrated unit), or partially implemented together.

Figure 2:
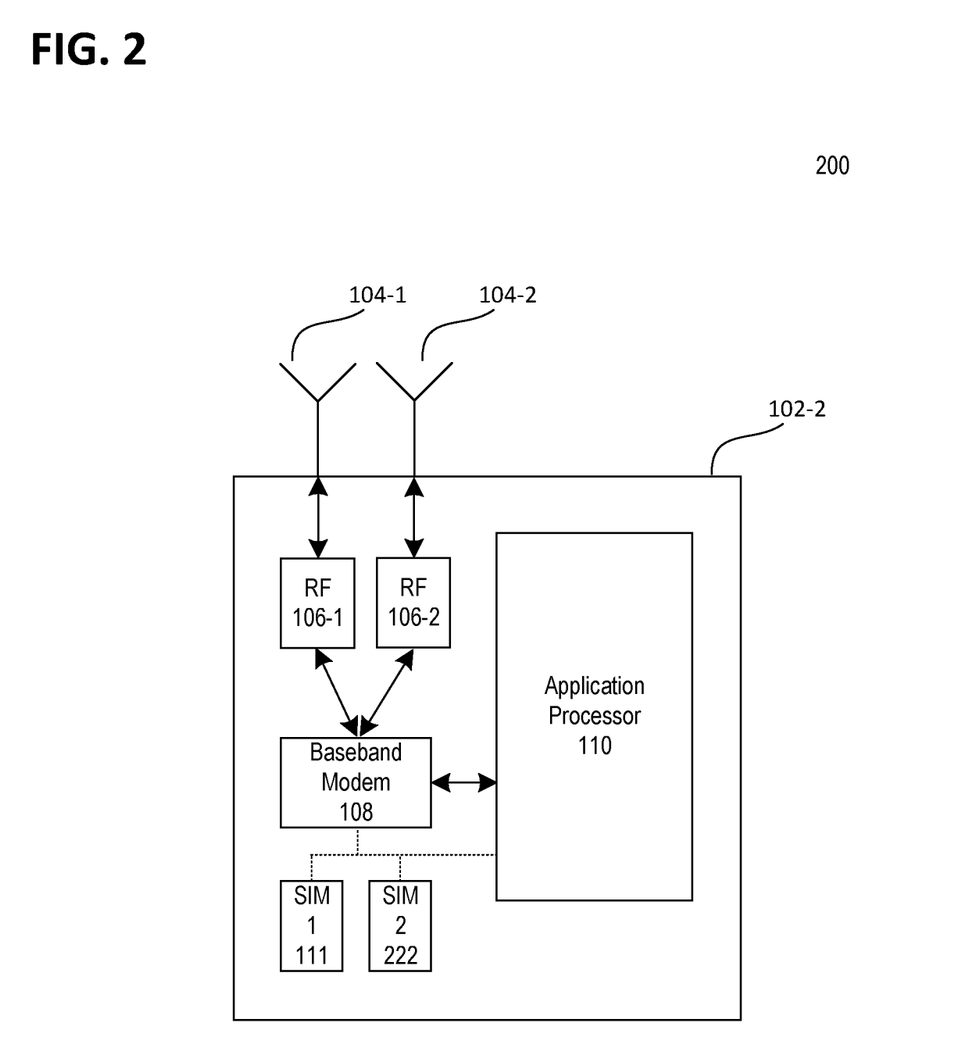
FIG. 2 shows a block diagram illustrating an internal configuration of a mobile communications device.

FIG. 2 shows a block diagram 200 illustrating an internal configuration of mobile communications device 102-2 according to an aspect of the disclosure. Mobile communications device 102-2 may be configured to: receive a first call on a first SIM 111 of a mobile communications device 102-2, receive a second call one a second SIM 222 of the mobile communications device 102-2, suspend the first call on a local hold, switch to the second call from the first call, and transmit a message to the first call while the second call is active.

Mobile communications device 102-2 may be the same or substantially similar to mobile communications device 102-1, thus differences between the mobile communications devices will mainly be discussed below. Aspects of components which are the same or substantially similar may not be reviewed here.

Mobile communications device 102-2 may include antenna 104-1, RF transceiver 106-1, antenna 104-2, and RF transceiver 106-2. Mobile communications device 102-2 may be a multi-SIM device. RF transceiver 106-1 may interact with antenna 104-1, while RF transceiver 106-2 may interact with antenna 104-2. RF transceiver 106-1 and antenna 104-1 may be dedicated to communications for first SIM 111, and RF transceiver 106-2 and antenna 104-2 may be dedicated to communications for second SIM 222. Baseband modem 108 may control, or interact with, RF transceiver 106-1 and RF transceiver 106-2 as a processing circuit. Baseband modem 108 may manage network communications for first SIM 111 and second SIM 222, which may include arbitrating between communications for first SIM 111 and second SIM 222 (e.g., allocating resources between first SIM 111 and second SIM 222).

Figure 3:
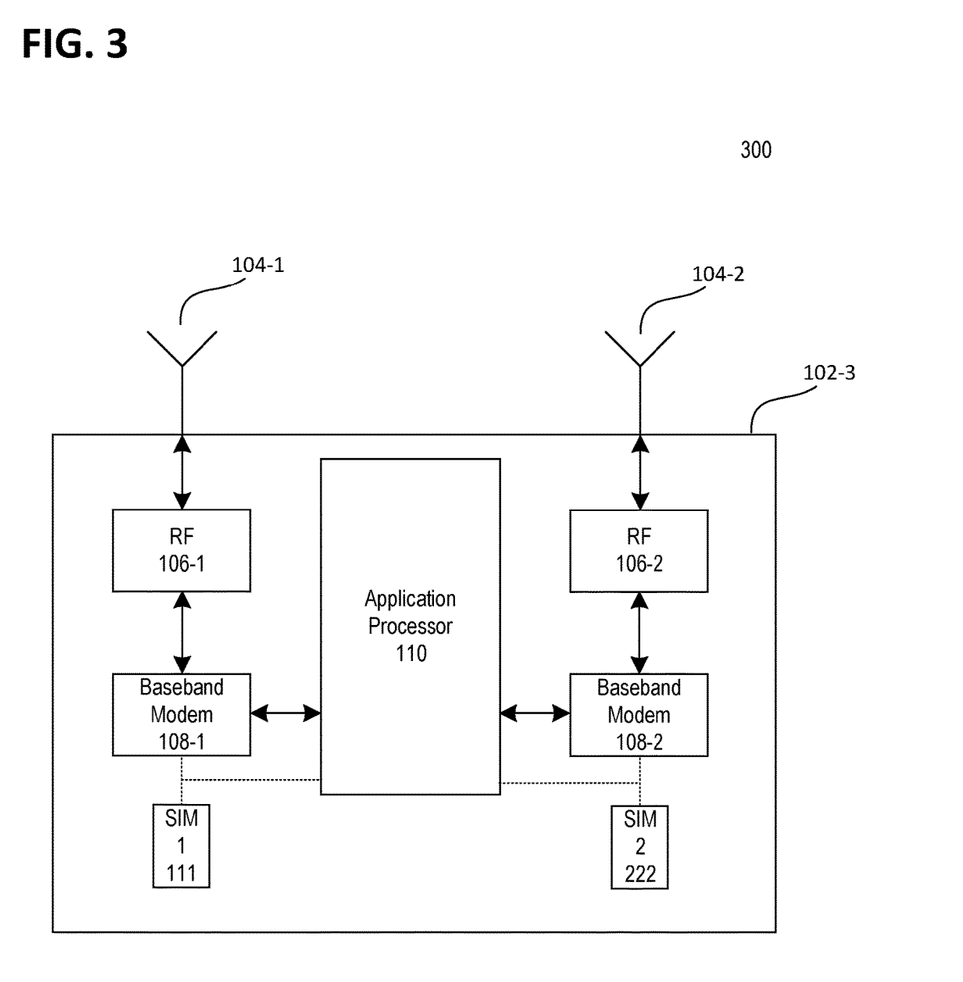
FIG. 3 shows a block diagram illustrating an internal configuration of a mobile communications device.

FIG. 3 shows a block diagram 300 illustrating an internal configuration of mobile communications device 102-3 according to an aspect of the disclosure. Mobile communications device 102-3 may be configured to: receive a first call on a first SIM 111 of a mobile communications device 102-3, receive a second call one a second SIM 222 of the mobile communications device 102-3, suspend the first call on a local hold, switch to the second call from the first call, and transmit a message to the first call while the second call is active.

Mobile communications device 102-3 may be the same or substantially similar to mobile communications device 102-1 and 102-2, thus differences between the mobile communications devices will mainly be discussed below. Aspects of components which are the same or substantially similar may not be reviewed here.

Mobile communications device 102-3 may be a multi-SIM device. FIG. 3 shows first SIM 111 and second SIM 222. Each SIM has a corresponding baseband modem, RF transceiver, and antenna, for radio network communications, e.g., baseband modem 108-1, RF transceiver 106-1, and antenna 104-1, may be dedicated to communications for first SIM 111, while baseband modem 108-2, RF transceiver 106-2, and antenna 104-2, may be dedicated to communications for second SIM 222.

Although baseband modem 108-1, baseband modem 108-2, and application processor 110, are depicted separately in FIG. 3, it is appreciated that this illustration is not limiting in nature. Accordingly, it is understood that baseband modem 108-1, baseband modem 108-2, and application processor 110, may be implemented separately, implemented together (i.e., as an integrated unit), or partially implemented together.

Figure 4:
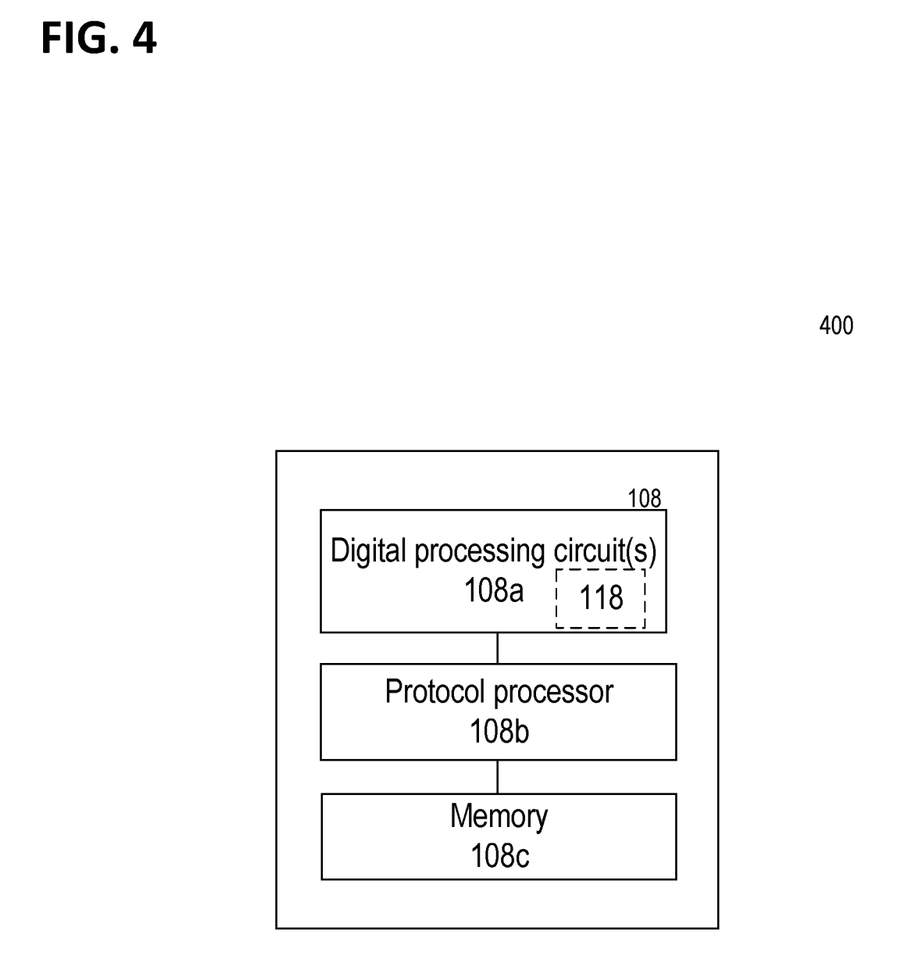
FIG. 4 shows a block diagram illustrating an internal configuration of a baseband modem.

FIG. 4 shows a block diagram 400 illustrating an internal configuration of baseband modem 108 (which may also be illustrative of baseband modem 108-1 and 108-2) according to an aspect of the disclosure. Baseband modem 108 may include digital processing circuit(s) 108*a* (i.e., one or more digital processing circuits), protocol processor 108*b*, and baseband memory 108*c*. Although not explicitly shown in FIG. 4, baseband modem 108 may contain one or more additional components, including, e.g., one or more analog processing circuits.

Digital processing circuit(s) 108*a* may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) 108*a* may include hardware, software, or a combination of hardware and software. Specifically, digital processing circuit(s) 108*a* of baseband modem 108 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of ordinary skill in the art will appreciate the corresponding structure disclosed herein, be it in explicit reference to a physical structure and/or in the form of mathematical formulas, prose, flow charts, or any other manner providing sufficient structure (such as, e.g., regarding an algorithm). The components of baseband modem 108 may be detailed herein substantially in terms of functional operation in recognition that a person of ordinary skill in the art may readily appreciate the various possible structural realizations of baseband modem 108 using digital processing circuitry that will provide the desired functionality.

Baseband modem 108 be configured to operate one or more protocol stacks, such as a GSM protocol stack, a UMTS protocol stack, an LTE protocol stack, etc. Baseband modem 108 may be "multi-mode", and may thus be configured to operate in accordance with multiple RATs by executing multiple protocol stack instances simultaneously. Accordingly, protocol processor 108*b* may be provided to execute one or more protocol stack instances. Protocol processor 108*b* may be, e.g., a processor, microprocessor, controller, microcontroller, Central Processing Unit (CPU), etc. For example, protocol processor 108*b* may be a microcontroller, and, therefore, may include a processor core, memory, and programmable input/output peripherals. Protocol processor 108*b* may be configured to execute the one or more protocol stack instances by executing program code corresponding to the one or more protocol stack instances, such as program code stored in an internal memory of protocol processor 108*b* (e.g., for protocol processor 108*b* implemented as a microcontroller) or in baseband memory 108*c*. By executing the one or more protocol stack instances, protocol processor 108*b* may act as a controller for operations of baseband modem 108, and may accordingly directly and/or indirectly control operations of digital processing circuit(s) 108*a*, baseband memory 108*c*, antenna 104, RF transceiver 106, other audio/video components (e.g., audio transducers including microphone(s) and/or speaker(s)), application processor 110, etc.).

Baseband memory 108*c* may include volatile and/or nonvolatile memory, including random access memory (RAM), read-only memory (ROM), flash memory, solid-state storage, magnetic tape, hard disk drive(s), optical drive(s), register(s), shift register(s), processor register(s), data buffer(s), etc., or any combination thereof. Baseband memory 108 may be configured to store software elements, which may be retrieved and executed using a processor component of digital processing circuit(s) 108*a*. Although depicted as a single component in FIG. 2, baseband memory 108*c* may be implemented as one or more separate components in baseband modem 108. Baseband memory 108*c* may also be partially or fully integrated with digital processing circuit(s) 108*a*.

As will be detailed, baseband modem 108 may include one or more digital processing circuits (digital processing circuit(s) 108*a* and/or protocol processor 108*b*) and a memory (baseband memory 108*c*). Baseband modem 108 (or baseband modem 108-1 or baseband modem 108-2) may be configured to: receive a first call on a first SIM 111 of a mobile communications device 102-1, receive a second call one a second SIM 222 of the mobile communications device 102-1, suspend the first call on a local hold, switch to the second call from the first call, and transmit a message to the first call while the second call is active.

Figure 5:
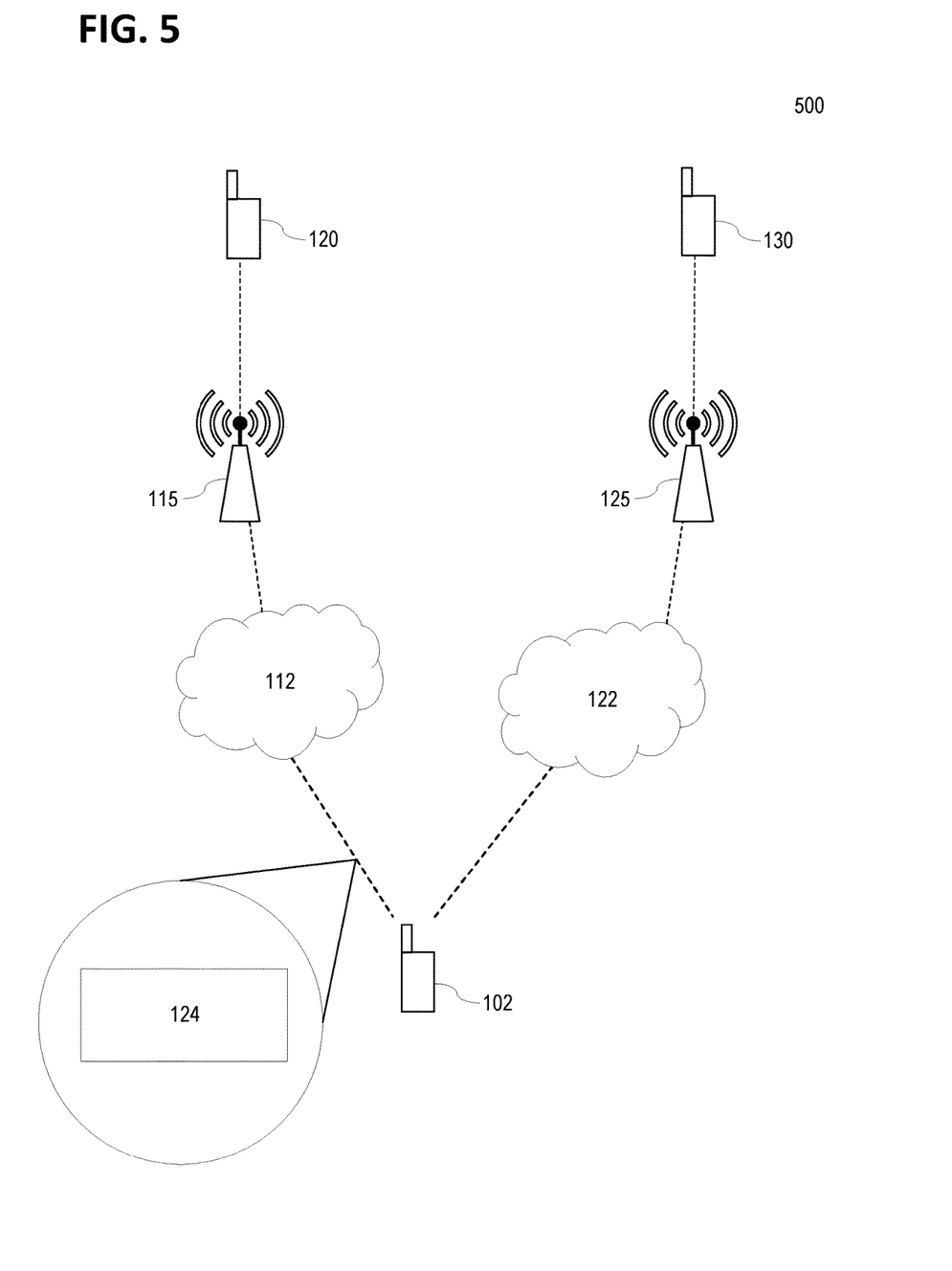
FIG. 5 shows an illustration of a mobile communication device in a mobile communications network.

FIG. 5 shows an illustration 500 of mobile communication device 102 (which may be any of mobile communications device 102-1, mobile communications device 102-2, or mobile communications device 102-3). Mobile communications device 102 communicates with mobile communications device 120 via an air interface depicting a first call 112 connected with first radio communications network 115, as well as with mobile communications device 130 via an air interface depicting a second call 122 connected with second radio communications network 125.

Mobile communications device 102 may be a multi-SIM device that includes first SIM 111 and second SIM 222 (as discussed above). First SIM 111 may be configured to operate with a first radio communications network 112. Second SIM 222 may be configured to operate with a second radio communications network 122. First radio communications network 112 may be different from second radio communications network 122, e.g., different providers or different public land mobile networks (PLMN).

First SIM 111 may be a multi-RAT SIM that may be able to access more than one RAT. Likewise, first radio communications network 112 may provide more than one RAT. Second SIM 222 may also be a multi-RAT SIM that may be able to access more than one RAT. Second radio communications network 122 may also provide more than one RAT.

First call 112 with mobile communications device 120 may be a voice call, i.e., a transmission of an audio signal or data that represents an audio signal, such as spoken voice or audio signals transmitted by mobile communications device 120. First call 112 may be circuit switched or packet switched. First call 112 may be initiated by either mobile communications device 102 or mobile communications device 120.

Second call 122 with mobile communications device 130 may also be a voice call. Second call 122 may be circuit switched or packet switched. Second call 122 may be initiated by either mobile communications device 102 or mobile communications device 130.

In a scenario as described above, (i.e., that mobile communications device 102 may accept a first call 112 received for the first SIM 111 of the mobile communications device 102, and establish an active call; that mobile communications device 102 may receive and accept a second call 122 for the second SIM 222 of the mobile communications device 102) the first call 112 may be suspended and placed on a local hold, for example, if supplementary services are not available.

The local hold may maintain an active connection (or ongoing connection) for the first call 112. For example, the local hold may maintain one or more bearers, e.g., radio bearers and/or signaling radio bearers, thus the first radio network 112 may be unaware (e.g., not provided with information of the local hold by mobile communications device 102 or not determined from by the first radio network 112 itself based on the connection). Likewise, a user of mobile communications device 120 may not be informed first call 112 has been placed on a (local) hold. A user of mobile communications device 102 may not have had an opportunity to communicate to a user of mobile communications device 120 that a second call 122 had been received from the point in time the page for an incoming call had been received on mobile communications device 102. In a conventional multi-SIM mobile communications device, if a first call, e.g., first call 112, is placed on a local hold, mobile communications device 102 may only transmit SIDs to mobile communications device 120; thus a user of mobile communications device 120 may only hear comfort noise without any indication the first call has been placed on hold.

Therefore, if mobile communications device 102 suspends the first call 112 on a local hold and switches to the second call 122 from the first call 112, i.e., second call 122 may be engaged, or may (also) become active, and mobile communications device 102 may transmit a message 124 to the first call 112 while the second call 122 is active.

The message 124 may be an audio signal, such as a spoken voice recording. The spoken voice recording may be pre-recorded. Likewise, message 124 may be any type of auditory signal, e.g., music, or any type of audio signal that may be transmitted by mobile communications device 102 (for example, an audio file uploaded to mobile communications device 102 or audio recorded on mobile communications device 102). The audio signal may be generated by user input or may be provided, e.g., in software or hardware of a component of mobile communications device 102. The audio signal may be continuously transmitted on first call 112, i.e., the audio signal may be looped, e.g., until such time as mobile communications device 102 re-engages (switches to or makes active) first call 112.

Message 124 may also be a text message, i.e., alternatively or additionally, mobile communications device 102 may transmit an electronic message including text, e.g., an SMS (short message service) message or an email, to mobile communications device 120.

Message 124 may convey to a user of mobile communications device 120 that first call 112 has been placed on hold, or a local hold, on mobile communications device 102. If the first call 112 is terminated while on local hold, e.g., after mobile communications device 120 receives message 124, mobile communications device 102 may begin call tear down procedures and provide a display message or prompt, e.g., on a display of mobile communications device 102 that the first call 112 has been terminated.

In addition, if message 124 cannot be transmitted, e.g, a detected absence of audio input is too short a time period to transmit message 124, mobile communications device 102 may attempt the transmission a finite number of times. After the finite number of attempts, mobile communications device 102 may not attempt to transmit message 124, e.g., to reduce power consumption.

In addition, an alternative message, e.g., a text message or SMS, may be transmitted to second call 122 during a detected absence of audio input during first call 112, if second call 122 is not engaged or made active, e.g., not accepted.

In reference to mobile communications device 102-1, the components: baseband modem 108, RF transceiver 106, and antenna 104, may be available to both first SIM 111 and second SIM 222, i.e., both SIMS may utilize the same components and mobile communications device 102-1 may not be able to continuously transmit message 124 to mobile communications device 120 on first call 112, as second call 122 may be active or engaged and requires the baseband modem 108, RF transceiver 106, and antenna 104, for the ongoing call.

In this scenario, mobile communications device 102-1 (or mobile communications device 102-2 or mobile communications device 103-3) may be further configured to detect an absence of audio input to the mobile communications device 102-1. For example, baseband modem 108 may additionally include a voice activity detector 118 (VAD, which may be implemented in digital processing circuit 108a) that may detect if audio signals are being input to the mobile communications device 102-1, e.g., by a user talking.

If an absence of audio input is detected, e.g., mobile communications device 102-1 does not detect voice activity during second call 122, mobile communications device 102-1 may be configured to transmit message 124 to first call 112 (and thus mobile communications device 120) during the absence of audio input. For example, instead of transmitting SIDs, which may contain data or information for comfort noise generation in mobile communications device 120, e.g., a descriptor of instantaneous inputs of background noise, to first call 112, a message 124, which may include a previously provided audio signal or text message, is transmitted to first call 112, i.e., mobile communications device 102-1 may transmit a message 124, prepared prior to first call 112 or second call 122, to a call placed on a local hold (e.g., first call 112, when mobile communications device 102-1 is engaged in a second call 122) on mobile communications device 102-1.

Therefore, during voice activity detected by baseband modem 108, baseband modem 108, RF transceiver 106, and antenna 104, may be utilized for second call 122, i.e., for network transmissions on second radio communications network 125 (for example, if mobile communications device 102-1 only has a single transmitter, it is utilized for second call 122 during voice activity). Once an absence of audio input is detected, baseband modem 108, RF transceiver 106, and antenna 104 (for example the single transmitter), may be utilized for first call 112 (e.g., on first SIM 111) to transmit message 124. Once voice activity resumes, baseband modem 108, RF transceiver 106, and antenna 104, may be re-engaged for second call 122. Thus, during any detected absence of audio input, transmission resources may be switched for transmitting message 124 for first call 112, until such time as voice activity resumes, i.e., voice activity is detected, or until second call 122 is terminated and first call 112 is no longer on a local hold, or until such time as first call 112 is terminated.

In reference to mobile communications device 102-2 and mobile communications device 102-3, message 124 may be continuously transmitted to first call 112, as mobile communications device 102-2 including baseband modem 108 may simultaneously utilize RF transceiver 106-1 and antenna 104-1 to transmit to first call 112 and RF transceiver 106-2 and antenna 104-2 to transmit to second call 122. Likewise, mobile communications device 102-3 may simultaneously utilize baseband modem 108-1, RF transceiver 106-1, and antenna 104-1 to transmit to first call 112 and baseband modem 108-2, RF transceiver 106-2, and antenna 104-2 to transmit to second call 122. Both mobile communications device 102-2 and mobile communications device 102-3, may, however, also be configured to transmit message 124 during a detected absence of audio input to the respective mobile communications devices.

In addition, mobile communications device 102-1, mobile communications device 102-2, and mobile communications device 102-3 (which may be referred to collectively as mobile communications device 102), may be configured to adjust a bit rate for the transmission of message 124. For example, speech (or audio signals transmitted on second call 122), may be transmitted at a second bit rate, while message 124 may be transmitted at a first bit rate on first call 112, i.e., the first bit rate may be different than the second bit rate, e.g., the first bit rate is lower than the second bit rate. Transmitting message 124 on first call 112 during a detected absence of audio input by mobile communications device 102 at a first bit rate lower than the second bit rate for transmitted audio signals on second call 122 may reduce interference with received audio signals on second call 122 during the transmission of message 124 for first call 112 (e.g., or transmitting message 124 at the lowest possible bit rate). Transmitting message 124 at a lower bit rate may also reduce power consumption. The first bit rate may be a bit rate for an audio codec, such as adaptive multi-rate (AMR) audio codec. Likewise, the second bit rate may be a bit rate for an audio codec, such as AMR audio codec. For example, in UMTS a bit rate may be 12.2 kb/s, 10.2 kb/s, 7.95 kb/, 7.40 kb/s, 6.70 kb/s, 5.90 kb/s, 5.15 kb/s, and 4.75 kb/s; in GSM, a full rate codec rate may be 13.0 kb/s; and in GSM Enhanced, a full rate codec rate may be 12.2 kb/s. If second call 122 is terminated, the first bit rate may be increased to standard operating parameters, e.g., dynamically selected by baseband modem 108 based on factors such as the quality of the connection, e.g., first call 112, on first radio communications network 115.

Mobile communications device 102 may be configured to receive message 124 at the mobile communications device 102. For example, mobile communications device 102 may prompt a user (e.g., when the mobile communications device is started) to provide an audio input to be recorded as an audio signal, e.g., message 124. Mobile communications device 102 (e.g., in particular, digital processing circuit 108a) may convert the audio signal into a digital form and save the digital form of message 124 in memory, e.g., memory 108c. For example, the audio signal may be converted by baseband modem 108 into a form that may be transmitted by RF transceiver 106 and antenna 104, i.e., the audio signal may be encoded and saved in a form ready to be transmitted by mobile communications device 102. In the scenario discussed above, the digital form of message 124 may be provided to a transmitter (e.g., RF transceiver 106 and antenna 104) configured to transmit message 124, when a call, e.g., first call 112, is placed on a local hold or an absence of an audio input is detected during the local hold of first call 112.

Likewise, as an example, mobile communications device 102 may prompt a user to provide a text message to be transmitted as message 124. The input text may be converted and saved in the form of an SMS message, e.g., converted into a digital form, which may then be saved in memory, e.g., memory 108c. In the scenario discussed above, the digital form of message 124 may be provided to a transmitter (e.g., RF transceiver 106 and antenna 104) configured to transmit message 124, when a call, e.g., first call 112, is placed on a local hold or an absence of an audio input is detected during the local hold of first call 112.

Figure 6:
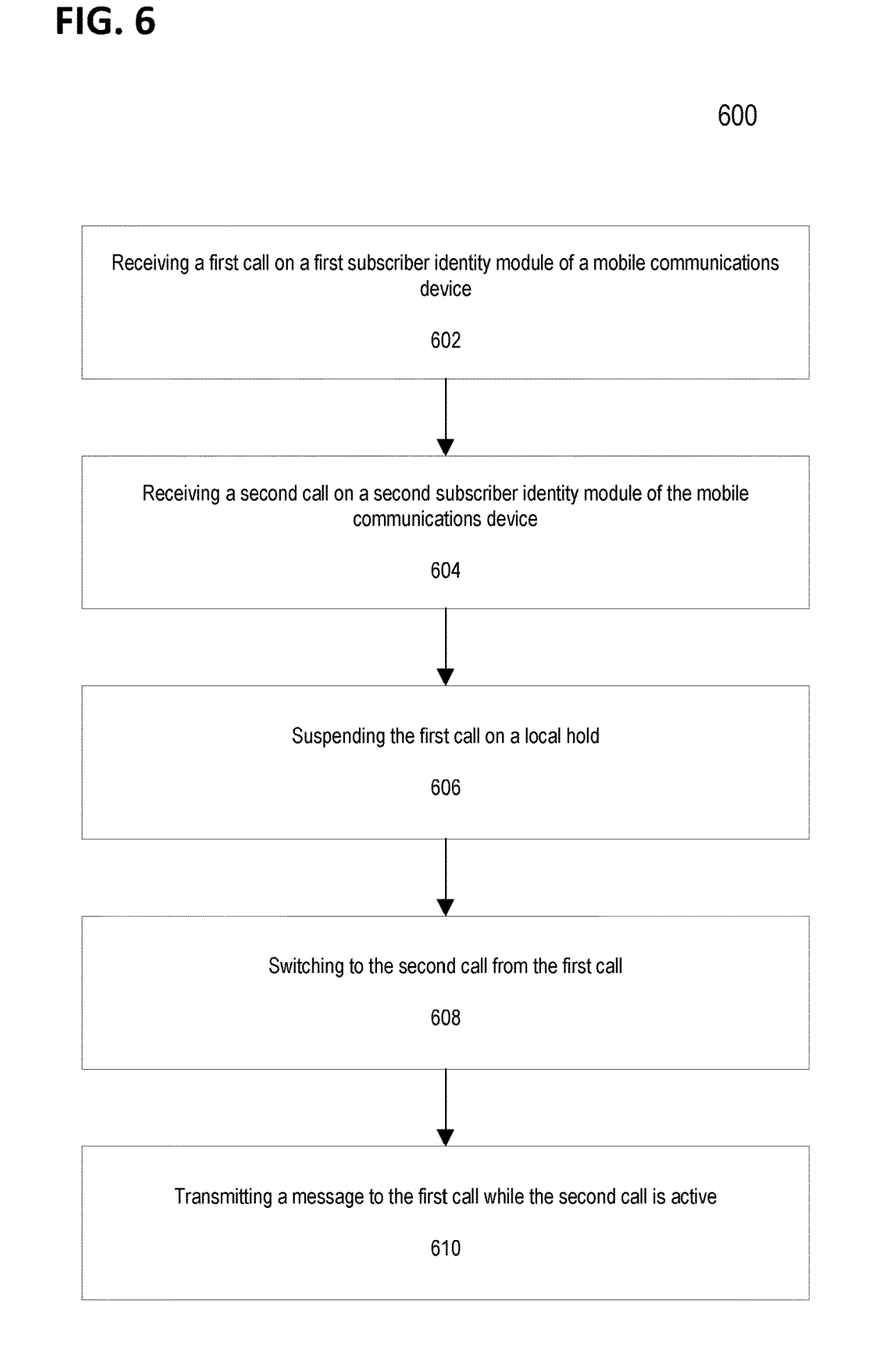
FIG. 6 shows a method for controlling a mobile communications device

FIG. 6 shows method 600 for controlling a mobile communications device 102, the method 600 including: receiving a first call 112 on first SIM 111 of a mobile communications device 102 (602), receiving a second call 122 on a second SIM 222 of the mobile communications device 102 (604), suspending the first call 112 on a local hold (606), switching to the second call 122 from the first call 112 (608), and transmitting a message 124 to the first call 112 while the second call 122 is active. A non-transitory computer readable medium may be configured to perform method 600.

First call 112 may be a voice call. First call 112 may be circuit switched or packet switched, e.g., VoLTE. Second call 122 may be a voice call, and may be circuit switched or packet switched.

First SIM 111 may be a multi-RAT SIM and may be configured to operate with a first radio communications network 115. Second SIM 222 may be a multi-RAT SIM and may be configured to operate with a second radio communications network 125. First radio communications network 115 may be different from second radio communications network 125.

The local hold may maintain an ongoing connection for the first call 112 on the mobile communications device 102. For example, one or more bearers for the first call 112 may be maintained during the local hold.

Switching to the second call 122 from the first call 112 may include engaging the second call 122 to be active.

Message 124 may be an audio signal. The transmission of message 124 may repeat, e.g., may be looped. Message 124 may be a text message, e.g., an SMS.

Mobile communications device 102 may have a first receiver and a second receiver, but only one transmitter. Alternatively, mobile communications device 102 may have more than one transmitter.

Method 600 may further include detecting an absence of audio input to the mobile communications device 102. Message 124 may be transmitted during the absence of audio input, which may be detected by a voice activity detector 118.

Method 600 may further include that speech for the second call 122 is transmitted at a second bit rate and the message 124 is transmitted to the first call 112 at a first bit rate. The first bit rate may be lower than the second bit rate, e.g., the first bit rate may be the lowest possible bit rate available. The first bit rate and the second bit rate may be bit rates for an audio codec, e.g., AMR audio codec.

In an aspect of method 600, the method may include receiving the message 124 at the mobile communications device 102, converting the message 124 into a digital form, saving the digital form in a memory, e.g., memory 108c, and providing the digital form of the message 124 to a transmitter configured to transmit the message. Message 124 may be an audio message or an SMS message.

Figure 7:
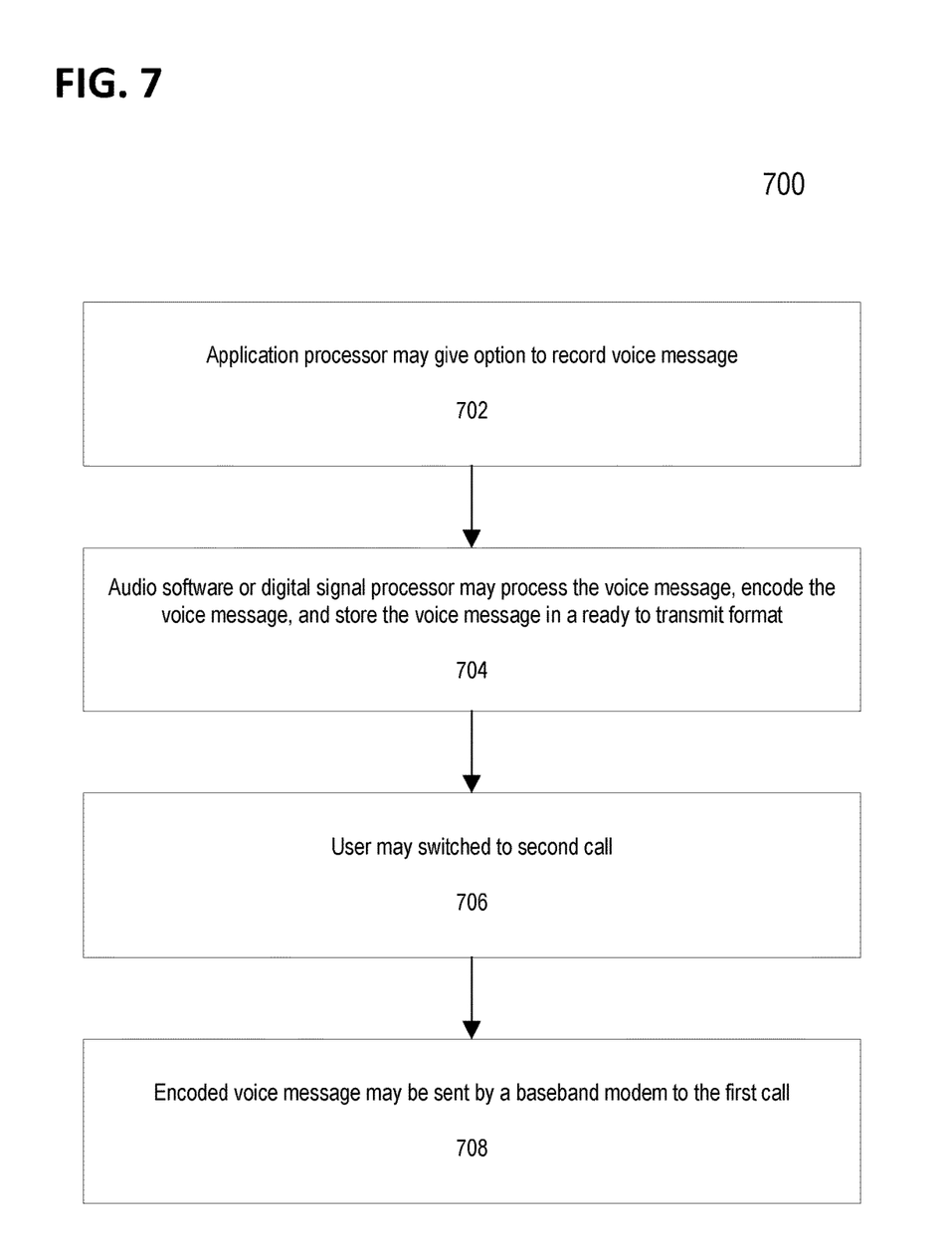
FIG. 7 shows a method for controlling a mobile communications device

FIG. 7 shows a method 700 for providing a message, e.g., message 124. Method 700 may include: an application processor, e.g., application processor 110, providing an option to record a voice message (702); audio software or a digital signal processor, e.g., digital processing circuit 108a, processing the voice message, encoding the voice message, and storing the voice message in a ready to transmit format, e.g., in memory 108c (704); switching to a second incoming call, e.g., second call 122 (706); and a baseband modem, e.g., baseband modem 108, to send the encoded voice message to the first call, e.g., first call 112 (708).

For example, as discussed above, mobile communications device 102 (which may be representative of mobile communications device 102-1, mobile communications device 102-2, and mobile communications device 102-3) may be configured to receive message 124 at the mobile communications device 102. For example, mobile communications device 102 may prompt a user (e.g., when the mobile communications device is started) to provide an audio input to be recorded as an audio signal, e.g., message 124. Mobile communications device 102 (e.g., in particular, digital processing circuit 108a) may convert the audio signal into a digital form and save the digital form of message 124 in memory, e.g., memory 108c. For example, the audio signal may be converted by baseband modem 108 into a form that may be transmitted by RF transceiver 106 and antenna 104, i.e., the audio signal may be encoded and saved in a form ready to be transmitted by mobile communications device 102. In the scenario discussed above, the digital form of message 124 may be provided to a transmitter (e.g., RF transceiver 106 and antenna 104) configured to transmit message 124, when a call, e.g., first call 112, is placed on a local hold or an absence of an audio input is detected during the local hold of first call 112.

In an aspect of the disclosure, Example 1 may be a mobile communications device including a radio processing circuit and a baseband processing circuit adapted to interact with the radio processing circuit, the mobile communications device configured to: receive a first call on a first SIM of a mobile communications device; receive a second call on a second SIM of the mobile communications device; suspend the first call on a local hold; switch to the second call from the first call; transmit a message to the first call while the second call is active.

Example 2 may include the mobile communications device of Example 1 further configured to: detect an absence of audio input to the mobile communications device.

Example 3 may include the mobile communications device of Example 2 further configured to: transmit the message during the absence of audio input.

Example 4 may include the mobile communications device of one of Examples 2 and 3, wherein the absence of audio input is detected by a voice activity detector.

Example 5 may include the mobile communications device of one of Examples 1-4, wherein speech for the second call is transmitted at a second bit rate and the message transmitted to the first call is transmitted at a first bit rate.

Example 6 may include the mobile communications device of Example 5, wherein the first bit rate is lower than the second bit rate.

Example 7 may include the mobile communications device of one of Examples 5 and 6, wherein the first bit rate is for an audio codec.

Example 8 may include the mobile communications device of Example 7, wherein the audio codec is adaptive multi-rate audio codec.

Example 9 may include the mobile communications device of one of Examples 5 and 6, wherein the second bit rate is for an audio codec.

Example 10 may include the mobile communications device of Example 9, wherein the audio codec is adaptive multi-rate audio codec.

Example 11 may include the mobile communications device of one of Examples 1-10 further configured to: receive the message at the mobile communications device.

Example 12 may include the mobile communications device of Example 11 further configured to: convert the message into a digital form.

Example 13 may include the mobile communications device of Example 12 further configured to: save the digital form of the message in a memory.

Example 14 may include the mobile communications device of Example 13 further configured to: provide the digital form of the message to a transmitter configured to transmit the message.

Example 15 may include the mobile communications device of Examples 11-14, wherein the message is an audio message or a short message service message.

Example 16 may include the mobile communications device of one of Examples 1-15, wherein the first call is a first voice call.

Example 17 may include the mobile communications device of Example 16, wherein the first voice call is circuit switched.

Example 18 may include the mobile communications device of Example 16, wherein the first voice call is packet switched.

Example 19 may include the mobile communications device of one of Examples 1-18, wherein the second call is a second voice call.

Example 20 may include the mobile communications device of Example 19, wherein the second voice call is circuit switched.

Example 21 may include the mobile communications device of Example 19, wherein the second voice call is packet switched.

Example 22 may include the mobile communications device of one of Examples 1-21, wherein the first subscriber identity module is configured to operate with a first radio communications network.

Example 23 may include the mobile communications device of Example 22, wherein the first subscriber identity module is a multi-radio access technology subscriber identity module.

Example 24 may include the mobile communications device of Example 22, wherein the second subscriber identity module is configured to operate with a second radio communications network.

Example 25 may include the mobile communications device of Example 24, wherein the first radio communications network is different from the second radio communications network.

Example 26 may include the mobile communications device of Example 24, wherein the second subscriber identity module is a multi-radio access technology subscriber identity module.

Example 27 may include the mobile communications device of one of Examples 1-26, wherein the local hold maintains an ongoing connection for the first call on the mobile communications device.

Example 28 may include the mobile communications device of Example 27, wherein the local hold maintains a bearer for the first call.

Example 29 may include the mobile communications device of Example 27, wherein the local hold maintains a plurality of bearers for the first call.

Example 30 may include the mobile communications device of one of Examples 1-29, wherein switching to the second call from the first call includes: engaging the second call to be active.

Example 31 may include the mobile communications device of one of Examples 1-30, wherein the message is an audio signal.

Example 32 may include the mobile communications device of Example 31, wherein the audio signal is looped.

Example 33 may include the mobile communications device of any of Examples 1-4 and 11-30, wherein the message is a text message.

Example 34 may include the mobile communications device of Example 33, wherein the text message is a short message service message.

Example 35 may include the mobile communications device of one of Examples 1-34, wherein the mobile communications device has a first receiver and a second receiver.

Example 36 may include the mobile communications device of one of Examples 1-35, wherein the mobile communications device has a transmitter.

Example 37 may include the mobile communications device of one of Examples 1-35, wherein the mobile communications device has a first transmitter and a second transmitter.

Example 38 may include the mobile communications device of one of Examples 1-37, wherein the mobile communications device is a multi-subscriber identity module device.

In an aspect of the disclosure, Example 39 may be a method for controlling a mobile communications device, the method including: receiving a first call on a first subscriber identity module of a mobile communications device; receiving a second call on a second subscriber identity module of the mobile communications device; suspending the first call on a local hold; switching to the second call from the first call; transmitting a message to the first call while the second call is active.

Example 40 may include the method of Example 39 further including: detecting an absence of audio input to the mobile communications device.

Example 41 may include the method of Example 40 further including: transmitting the message during the absence of audio input.

Example 42 may include the method of one of Examples 40 and 41, wherein the absence of audio input is detected by a voice activity detector.

Example 43 may include the method of one of Examples 39-42, wherein speech for the second call is transmitted at a second bit rate and the message transmitted to the first call is transmitted at a first bit rate.

Example 44 may include the method of Example 43, wherein the first bit rate is lower than the second bit rate.

Example 45 may include the method of one of Examples 43 and 44, wherein the first bit rate is for an audio codec.

Example 46 may include the method of Example 45, wherein the audio codec is adaptive multi-rate audio codec.

Example 47 may include the method of one of Examples 43 and 44, wherein the second bit rate is for an audio codec.

Example 48 may include the method of Example 47, wherein the audio codec is adaptive multi-rate audio codec.

Example 49 may include the method of one of Examples 39-48 further including: receiving the message at the mobile communications device.

Example 50 may include the method of Example 49 further including: converting the message into a digital form.

Example 51 may include the method of Example 50 further including: saving the digital form of the message in a memory.

Example 52 may include the method of Example 51 further including: providing the digital form of the message to a transmitter configured to transmit the message.

Example 53 may include the method of one of Examples 49-53, wherein the message is an audio message or a short message service message.

Example 54 may include the method of one of Examples 39-53, wherein the first call is a first voice call.

Example 55 may include the method of Example 54, wherein the first voice call is circuit switched.

Example 56 may include the method of Example 54, wherein the first voice call is packet switched.

Example 57 may include the method of one of Examples 39-56, wherein the second call is a second voice call.

Example 58 may include the method of Example 57, wherein the second voice call is circuit switched.

Example 59 may include the method of Example 57, wherein the second voice call is packet switched.

Example 60 may include the method of one of Examples 39-59, wherein the first subscriber identity module is configured to operate with a first radio communications network.

Example 61 may include the method of Example 60, wherein the first subscriber identity module is a multi-radio access technology subscriber identity module.

Example 62 may include the method of Example 60, wherein the second subscriber identity module is configured to operate with a second radio communications network.

Example 63 may include the method of Example 62, wherein the first radio communications network is different from the second radio communications network.

Example 64 may include the method of Example 62, wherein the second subscriber identity module is a multi-radio access technology subscriber identity module.

Example 65 may include the method of one of Examples 39-64, wherein the local hold maintains an ongoing connection for the first call on the mobile communications device.

Example 66 may include the method of Example 65, wherein the local hold maintains a bearer for the first call.

Example 67 may include the method of Example 65, wherein the local hold maintains a plurality of bearers for the first call.

Example 68 may include the method of one of Examples 39-67, wherein switching to the second call from the first call includes: engaging the second call to be active.

Example 69 may include the method of one of Examples 39-68, wherein the message is an audio signal.

Example 70 may include the method of Example 69, wherein the audio signal is looped.

Example 71 may include the method of any of Examples 39-42 and 49-68, wherein the message is a text message.

Example 72 may include the method of Example 71, wherein the text message is a short message service message.

Example 73 may include the method of one of Examples 39-72, wherein the mobile communications device has a first receiver and a second receiver.

Example 74 may include the method of one of Examples 39-73, wherein the mobile communications device has a transmitter.

Example 75 may include the method of one of Examples 39-73, wherein the mobile communications device has a first transmitter and a second transmitter.

In an aspect of the disclosure Example 76 may include a non-transitory computer readable medium configured to perform the method of any of Examples 39-75.

Example 77 may include the mobile communications device of one of Examples 1-38, wherein the first SIM is an embedded SIM.

Example 78 may include the mobile communications device of Example 77, wherein the embedded SIM is external to the mobile communications device.

Example 79 may include the mobile communications device of one of Examples 1-38, wherein the second SIM is an embedded SIM.

Example 80 may include the mobile communications device of Example 79, wherein the embedded SIM is external to the mobile communications device.

Example 81 may include the method of one of Examples 39-75, wherein the first SIM is an embedded SIM.

Example 82 may include the method of Example 81, wherein the embedded SIM is external to the mobile communications device.

Example 83 may include the mobile communications device of one of Examples 39-75, wherein the second SIM is an embedded SIM.

Example 84 may include the method of Example 83, wherein the embedded SIM is external to the mobile communications device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A mobile communications device comprising a radio processing circuit and a baseband processing circuit adapted to interact with the radio processing circuit, the mobile communications device configured to:
  receive a first call based on a first subscription of a mobile communications device;
  receive a second call based on a second subscription of the mobile communications device;
  pause the first call on a local hold;
  switch to the second call from the first call; and
  provide an audio message at a first bit rate from the mobile communications device to the first call while the second call is active;
  wherein speech for the second call is provided at a second bit rate.

2. The mobile communications device of claim 1 further configured to:
  detect an absence of audio input to the mobile communications device.

3. The mobile communications device of claim 2 further configured to:
  provide the audio message during the absence of audio input.

4. The mobile communications device of claim 1, wherein the first bit rate is lower than the second bit rate.

5. The mobile communications device of claim 1 further configured to:
  receive the audio message at the mobile communications device.

6. The mobile communications device of claim 5 further configured to:
  convert the audio message into a digital form.

7. The mobile communications device of claim 6 further configured to:
  save the digital form of the audio message in a memory.

8. The mobile communications device of claim 7 further configured to:
  provide the digital form of the audio message to a transmitter configured to provide the audio message.

9. The mobile communications device of claim 1, wherein the first call and/or the second call is a voice call.

10. A method for controlling a mobile communications device, the method comprising:
  receiving a first call based on a first subscription of a mobile communications device;
  receiving a second call based on a second subscription of the mobile communications device;
  suspending the first call on a local hold;
  switching to the second call from the first call;
  detecting an absence of audio input to the mobile communications device on the second call;
  providing an audio message at a first bit rate to the first call while the second call is active;
  wherein speech for the second call is provided at a second bit rate; and
  providing the audio message during the absence of audio input.

11. The method of claim 10,
wherein the first bit rate is lower than the second bit rate.

12. The method of claim 10,
wherein the first bit rate is for an audio codec.

13. The method of claim 10,
wherein the second bit rate is for an audio codec.

14. The method of claim 10 further comprising:
receiving the audio message at the mobile communications device.

15. The method of claim 14 further comprising:
converting the audio message into a digital form.

16. The method of claim 15 further comprising:
saving the digital form of the audio message in a memory.

17. The method of claim 16 further comprising:
providing the digital form of the audio message to a transmitter configured to provide the audio message.

18. The method of claim 16,
wherein the first call and/or the second call is a voice call.

19. A mobile communications device comprising a radio processing circuit and a baseband processing circuit adapted to interact with the radio processing circuit, the mobile communications device configured to:

convert an audio message into a digital form;

store the digital form of the audio message in a memory of the mobile communications device receive a first call for a first subscription of the mobile communications device;

receive a second call for a second subscription of the mobile communications device;

pause the first call on a local hold;

switch to the second call from the first call; and provide the stored digital form of the audio message to a transmitter of the mobile communications device that is configured to provide the audio message to the first call while the second call is active;

wherein speech for the second call is provided at a second bit rate and the audio message provided to the first call is provided at a first bit rate lower than the second bit rate.

20. The mobile communications device of claim 19,
wherein the first call and/or the second call is a voice call.

* * * * *